Patented Dec. 30, 1941

2,268,162

UNITED STATES PATENT OFFICE 2,268,162

MANUFACTURE OF HALOGENATED DERIVATIVES OF ETHYLENE POLYMERS

James Robertson Myles and Francis Stephen Bridson-Jones, Northwich, England, assignors to Imperial Chemical Industries Limited, a corporation of Great Britain No Drawing. Application August 14, 1939, Serial No. 290,072. In Great Britain August 23, 1938

4 Claims. (Cl. 260—94)

This invention relates to the manufacture of halogenated derivatives of normally solid or semi-solid polymers of ethylene (which may contain a small amount of oxygen) such as may be obtained by subjecting ethylene, with or without a small content of oxygen, to very high pressure and moderately elevated temperature.

By subjecting such ethylene polymers to the action of one or more halogens or halogen compounds capable of introducing halogen, for which purpose the ethylene polymers may be dissolved or suspended in halogen-stable media (e. g. carbon tetrachloride or acetic acid) halogenated ethylene polymers are obtained. The properties of the halogenated ethylene polymers are dependent upon the proportion of halogen introduced, (which may range up to about 70 per cent by weight in the case of chlorinated ethylene polymers) as well as upon the conditions of preparation. The production of halogenated ethylene polymers from normally solid ethylene polymers is described and claimed in U. S. Patent 2,183,556.

This invention has as an object to devise a new method of manufacturing halogenated ethylene polymers. A further object is to devise a method of manufacturing halogenated ethylene polymers which, for a given halogen content, will yield halogenated polymers having improved physical and mechanical properties compared with existing ethylene polymers. A still further object is to provide new halogenated ethylene polymers. Further objects will appear hereinafter. These objects are accomplished by the following invention.

We have now found that by mixing a halogenated ethylene polymer containing a given proportion of halogen with one or more containing a different proportion of halogen, the resulting product exhibits improved properties compared with a material prepared by halogenating ethylene polymer to the same average halogen content as the mixture. In other words, for a halogenated ethylene polymer material of given halogen content, a better material is obtained by mixing two or more halogenated ethylene polymers of different halogen contents than by directly halogenating ethylene polymer to the required halogen content. The properties concerned are, in particular, toughness, impact resistance, creep resistance, tensile strength and softening point, one or more of which are higher, for a given halogen content, in the mixed product than in the single or directly-prepared product.

Generally speaking, it is advantageous to apply the invention to the mixing of initial materials having as wide a difference in halogen content as possible, but there is a certain limitation to this by reason of the fact that products of halogen contents differing by more than a certain amount are incompatible, or not readily compatible. In the case of chlorinated ethylene polymers, the limiting difference in chlorine content appears to be about 12 per cent, i. e. chlorinated ethylene polymers differing in chlorine content by more than about 12 per cent are incompatible or are not readily compatible.

The problem of incompatibility can largely be overcome by the use of ternary, quaternary mixtures and the like. Thus with two chlorinated polymers having a difference of chlorine content outside the normal compatibility range there may be mixed one or more chlorinated polymers of such intermediate chlorine content that the ternary, etc. mixture is compatible. This method of mixing is illustrated in Example 5. It appears, too, that certain properties such as flexibility are particularly susceptible to improvement by making ternary and higher multi-component mixtures.

When the mixture is to be used for the production of more or less massive articles, e. g. moulded shapes, or of articles in which transparency or translucency is not required, then complete compatibility is not absolutely essential, and the chlorinated ethylene polymers employed may differ in chlorine content by rather more than the aforesaid 12 per cent. When the mixture is to be used for the production of articles which are to be transparent or translucent, e. g. films, the initial materials should be chosen so as to be within the range of complete or substantially complete compatibility. The mixing operation can, if desired, be effected in more than one stage.

The mixing operation can be carried out in various ways, for example by use of a mixing mill at a suitable temperature, or by mixing solutions of the initial materials (e. g. benzene or xylene solutions) and afterwards evaporating off the solvent or precipitating the mixture of halogenated ethylene polymers therefrom.

The following examples illustrate but do not limit the invention.

Example 1

The ethylene polymer referred to in this example was of molecular weight about 15,000. 50 parts of chlorinated ethylene polymer containing 44 per cent of chlorine were mixed with 50 parts of chlorinated ethylene polymer containing 52 per cent of chlorine, the mixing being effected at 80° C. by means of a roller mixing mill. The resulting product was homogeneous, had a mean chlorine content of 48 per cent, and a film tensile strength of 190 kg./cm.$^2$, whereas a material prepared by chlorinating ethylene polymer to 48 per cent chlorine had a film tensile strength of only 145 kg./cm.$^2$. Further the softening point of the mixed product was some 12° C. higher than that of the directly prepared material. The softening points were determined by a ball and film method in which a small steel ball is supported on a horizontal film of the material and the temperature is raised under standard conditions until the ball penetrates the film. The softening point is taken as the temperature at which a given point on the ball passes through the film.

Example 2

The ethylene polymer referred to in this example is of average molecular weight 17,000. 50 parts of chlorinated ethylene polymer containing 40% chlorine are mixed with 50 parts of chlorinated ethylene polymer containing 44% chlorine by the solution method. The resulting homogeneous product has a tensile strength of 110 kg./cm.$^2$ compared with 60 kg./cm. of a "straight" chlorinated ethylene polymer of same chlorine content, i. e. 42%.

Example 3

The ethylene polymer referred to in this example is of average molecular weight 17,000. 40 parts of chlorinated ethylene polymer of chlorine content 42% are mixed with 11 parts chlorinated ethylene polymer of chlorine content 51.5%. The homogeneous product of average chlorine content 44% has a higher tensile strength than a straight chlorinated ethylene polymer of the same chlorine content, the actual figures being 100 kg./cm.$^2$ and 70 kg./cm.$^2$. The softening range of the product is higher, 50°–70°–93° C. compared with 40°–60°–77° C.

Example 4

The ethylene polymer referred to in this example is of average molecular weight 17,000.

A straight chlorinated ethylene polymer of chlorine content 48.5% is compared with homogeneous mixed chlorinated ethylene polymer products of the same, or nearly the same, chlorine contents. The "straight" material has a tensile strength of 150 kg./cm.$^2$ and a softening range 50°–68°–87° C. A material obtained by mixing 30 parts chlorinated ethylene polymer of chlorine content 40% with 70 parts chlorinated ethylene polymer of chlorine content 51.5%, i. e. having an average chlorine content 48%, has a tensile strength 170 kg./cm.$^2$, and a softening range 58°–79°–105° C. Similarly, a material obtained by mixing 47 parts of 44% chlorinated ethylene polymer with 53 parts of 51.5% chlorinated ethylene polymer, i. e. of overage chlorine content 48%, has a tensile strength of 190 kg./cm.$^2$ and a softening range 60°–80°–98° C. Finally, a material obtained by mixing 50 parts of 44% chlorinated ethylene polymer with 50 parts of 54% chlorinated ethylene polymer has a tensile strength 160 kg./cm.$^2$ and a softening range 60°–80°–102° C.

Example 5

The tensile strength, elongation at break and creep resistance, of three chlorinated ethylene polymers, the initial ethylene polymer being of molecular weight about 17,000, each of 50% average chlorine content were compared. The three materials were:

A. Straight chlorinated ethylene polymer (C. P.).
B. Mixture of 50 parts of 43% chlorine C. P. and 50 parts of 57% chlorine C. P.
C. Mixture of 33 parts of 43% chlorine C. P., 33 of 50% chlorine C. P. and 33 of 57% chlorine C. P.

Mixing was effected as in Example 1. The results were:

| Material | Tensile strength | Elongation at break | Creep resistance (25° C.) |
|---|---|---|---|
|  | Kg./cm.$^2$ | Percent |  |
| A | 165 | 125 | 140 |
| B | 85 | 170 | <2 |
| C | 150 | 200 | >150 |

B was an incompatible mixture and shows a decreased tensile strength, markedly decreased creep resistance, but an increased flexibility compared with A. C, a compatible mixture, shows a still further increased flexibility, a better creep resistance than A, and a tensile strength higher than B but still slightly below that of A.

Creep resistance in this and other examples was measured by extending a strip of cast films of the material under contant load and constant temperature. The figures quoted are 10×(load in kg./cm.$^2$ required to produce 10% extension between 10 and 70 minutes after the first application of the load).

Example 6

The properties of three chlorinated ethylene polymers (the initial ethylene polymer being of molecular weight about 40,000) were compared. The three materials were:

A. Straight chlorinated ethylene polymer (C. P.): chlorine content 51.7%.
B. Binary mixture of equal parts of C. P.'s with 48.6% and 54.6% of chlorine: chlorine content of mixture 51.6%.
C. Five-component mixture of equal parts of C. P.'s with 46.3, 48.6, 52.7, 53.1 and 55.7% chlorine: chlorine content of mixture 51.4%.

Mixing in each case was effected in a roller mixing mill at a temperature of 80° C.

The materials compared as follows:

| Material | Tensile strength | Elongation at break | Creep resistance (25°C.) |
|---|---|---|---|
|  | Kg./cm. | Percent |  |
| A | 170 | 220 | 46 |
| B | 240 | 185 | 250 |
| C | 230 | 210 | 240 |

Example 7

A mixture of equal parts of four chlorinated ethylene polymers (molecular weight of initial ethylene polymer about 40,000) with respectively 47, 53.1, 54.5 and 55.7% of chlorine was prepared in a roller mixing mill at 100° C. The properties of the mixture, the average chlorine content of which was 53%, were compared with those of a chlorinated ethylene polymer directly chlorinated to 53%.

|  | Tensile strength | Elongation at break | Creep resistance (25° C.) |
|---|---|---|---|
|  | Kg./cm.$^2$ | Percent |  |
| Single material | 175 | 12 | >500 |
| Quaternary mixture | 165 | 300 | >500 |

Further, the mixture has a softening temperature higher than that of the single material at all points in the softening range, namely,

|  | Single material | Mixture |
| --- | --- | --- |
| Onset of softening | 72 | 78 |
| Half-way stage | 103 | 118 |
| Complete passage of ball through film | 130 | 146 |

*Example 8*

The ethylene polymers referred to in this example have a molecular weight about 18,000. A chlorinated ethylene polymer of chlorine content 55% has an impact strength of 1.9 in the units of the testing machine. A material is obtained by mixing 2 parts of chlorinated ethylene polymer of chlorine content 59% with 1 part of chlorinated ethylene polymer of chlorine content 47% which, having the same average chlorine content (55%) has an impact strength of 11 units. Both materials are hard and relatively inflexible. The test pieces are in each case cut from compression moulded discs of thickness 0.4–0.5 cms.

*Example 9*

A material obtained by mixing 5 parts of chlorinated ethylene polymer of chlorine content 59% with 1 part of chlorinated ethylene polymer of chlorine content 47% has a higher impact strength than a straight chlorinated ethylene polymer of the same average chlorine content (57%); the comparative figures are 7.5 units and 1.2 units. The initial ethylene polymer has an average molecular weight of about 18,000. In each case the test pieces are cut from compression moulded discs of thickness 0.4–0.5 cms.

In the above examples, instead of using chlorinated ethylene polymers we could have used brominated, iodinated, or fluorinated ethylene polymers, and instead of using a simple binary mixture of a highly halogenated and a lowly halogenated polymer, we could with advantage have used ternary or quaternary mixtures using ethylene polymers with three or four different halogen contents. By this means it is sometimes possible to overcome the incompatibility between polymers having a difference in halogen content of more than 12 per cent, and to obtain a still further improvement in one or more of the aforesaid properties. Thus, with two polymers having a difference in chlorine content outside the normal compatibility range there may be mixed one or more polymers of such intermediate chlorine content that the ternary or quaternary mixture is compatible.

The mixtures of halogenated ethylene polymers in general exhibit more or less the same gradation of character according to halogen content as do the directly prepared halogenated polymers, e. g. mixtures containing around 15 to 30 per cent of chlorine resemble hard or crepe rubber and those containing around 30 to 40 per cent are soft and tacky, while those containing between 42 and 55 per cent of chlorine are tough, flexible, gutta percha-like materials, and those containing upwards of about 55 per cent of chlorine are hard and glassy. The present invention is of particular advantage in connection with the production of the halogenated polymers of three types namely, the type having a chlorine range 15 to 30 per cent, the type having the chlorine range of 42 to 55 per cent, and the type having the chlorine range of 55 to 67 per cent.

The molecular weights mentioned herein were obtained by the method for determining the molecular weights of polymers of high molecular weight devised by H. Staudinger (see Berichte der deutschen chemischen Ges. 1934, 67B, 1247 et seq.), this method being based upon the measurement of the viscosity of a solution of the polymer in a solvent (tetra-hydronaphthalene). As a consequence, the molecular weights mentioned herein will only be as accurate as this method of measuring them.

The mixing operation can be carried out by various methods, for example by use of a mixing mill at a suitable temperature, or by mixing solutions of the initial materials (e. g. xylene solutions) and afterwards evaporating off the solvent or precipitating the mixture of halogenated ethylene polymers therefrom. Any conventional type of mixer may be used in carrying out the first method, e. g. mixers of the kind used in compounding rubber or a Werner-Pfleiderer mixer. As examples of solvents which can be applied in the second method may be quoted trichlorethylene, toluene, xylene, tetra-hydronaphthalene, and as examples of precipitant liquids methyl and ethyl alcohols, acetone, and petroleum ether.

In some of the above examples a softening range has been given consisting of a series of three temperatures. The first temperature denotes that at which the film begins to sink under the weight of the ball, the second that at which half of the ball has passed through the support ring, and the third that when the ball has sunk one inch below the ring.

As many apparently widely different embodiments of this invention may be made without departing from the spirit and scope thereof, it is to be understood that the invention is not limited to the specific embodiments thereof except as defined in the appended claims.

We claim:

1. A composition of matter which consists essentially of a homogeneous mixture of halogenated ethylene polymers of different halogen content and which consists preponderately of the product obtained by mixing two different halogenated ethylene polymers differing in halogen content by at least 4% and by not more than 12%, the amounts of said polymers of different halogen content present in the mixture being from about equal parts thereof to about five parts of one and about one part of the other.

2. The composition of matter set forth in claim 1 in which the halogen contained in said halogenated ethylene polymers is chlorine.

3. The composition of matter set forth in claim 1 in which said mixture of halogenated ethylene polymers is composed of about 50 parts of chlorinated ethylene polymer containing about 40% chlorine and about 50 parts of chlorinated ethylene polymer containing about 44% chlorine.

4. The composition of matter set forth in claim 1 in which said mixture of halogenated ethylene polymers is composed of about 40 parts of chlorinated ethylene polymer containing about 42% chlorine and about 11 parts of chlorinated ethylene polymer containing about 51.5% chlorine.

JAMES ROBERTSON MYLES.
FRANCIS STEPHEN BRIDSON-JONES.